United States Patent [19]
Adair

[11] Patent Number: 5,576,551
[45] Date of Patent: Nov. 19, 1996

[54] ULTRAVIOLET SUNDIAL

[76] Inventor: John E. Adair, 7864 Toland Ave., Los Angeles, Calif. 90045

[21] Appl. No.: 358,109

[22] Filed: Dec. 16, 1994

[51] Int. Cl.$^6$ ........................................................ G01J 1/38
[52] U.S. Cl. ......................................................... 250/472.1
[58] Field of Search ........................... 250/472.1, 372 GM

[56] References Cited

U.S. PATENT DOCUMENTS

| | | | |
|---|---|---|---|
| 157,586 | 12/1874 | Devlin . | |
| 1,270,505 | 6/1918 | Fields . | |
| 1,496,403 | 6/1924 | Atkinson . | |
| 2,536,328 | 1/1951 | Triplett . | |
| 2,904,889 | 9/1959 | France, II | 33/61 |
| 3,412,494 | 11/1968 | Vogel | 40/70 |
| 3,829,980 | 8/1974 | Iversen | 33/270 |
| 3,832,842 | 9/1974 | Parker | 58/50 R |
| 4,032,754 | 6/1977 | Ageton | 235/78 R |
| 4,237,611 | 12/1980 | Wurch | 33/1 DD |
| 4,346,521 | 8/1982 | Luft | 33/269 |
| 5,028,792 | 7/1991 | Mullis | 250/474.1 |
| 5,173,609 | 12/1992 | Lacoste et al. | 250/370.07 |
| 5,186,630 | 2/1993 | Tien | 434/149 |

*Primary Examiner*—Carolyn E. Fields
*Attorney, Agent, or Firm*—Cislo & Thomas

[57] ABSTRACT

A device for indicating the percentage of ultraviolet radiation which reaches the earth's surface for a given position of the Sun's altitude. The device consists of a planar member having a gnomon-like member affixed within its center. The gnomon-like member marks the center of nine (9) spaced concentric rings inscribed on a top surface of the planar member. The innermost circle is labeled 90%, the second 80% and so on to an outer edge. The radius for the circumference of each ring is calculated by a mathematical formula which correlates the altitude of the sun with a percentage amount of UV-B that reaches the surface of the earth.

18 Claims, 1 Drawing Sheet

ULTRAVIOLET SUNDIAL

BACKGROUND OF THE INVENTION

The present invention relates generally to radiation indicating devices and more particularly to a device for displaying the percentage of ultraviolet radiation reaching the surface of the earth as a function of the amount of ultraviolet radiation received when the sun is located at zenith with respect to the earth's surface.

It is generally well known that the sun emits within the electromagnetic spectrum ultraviolet light having wavelengths from 2000 to 3800 angstroms. Within this range of ultraviolet light is a type of radiation known as UV-B which is that part of the ultraviolet spectrum between 2800 and 3200 angstroms, and is that spectrum which is eagerly sought by millions of people in the summertime desiring a stylish tan. However, this type of radiation is responsible not only for glowing tans but also for sunburns, premature aging of the skin, and some forms of skin cancer.

In order for a person to minimize their health risk or to maximize their tan, they need to know how much biologically active UV-B radiation is present for a given time of day. The amount of UV-B radiation intensity at the earth's surface depends upon a variety of factors including, the thickness of the ozone layer in the upper atmosphere, the elevation above sea level, the time of day, the time of year, and local conditions such as clouds, fog, dust and smoke.

Numerous devices have been developed to measure a person's exposure to ultraviolet radiation. These devices include spectrophotometers which quantitate the appearance or disappearance of a chemical species relative to the amount of ultraviolet radiation present. Additionally, there are actinometry devices which use photochemically mediated detection or measurement in determining the amount of radiation in the ultraviolet range. However, there are disadvantages associated with actinometry devices and spectrophotometers due to their inability to accurately discriminate among small wavelength bands within the electromagnetic spectrum.

Therefore, it would be desirable to have a simple mechanical device for displaying the percentage of ultraviolet radiation in the UV-B spectrum for a given time of day. Additionally, it would be useful to have a device of simple construction which alerts a person that they are being exposed to possibly harmful rays.

The subject invention herein indicates the percentage of ultraviolet radiation by use of a conventional sundial in a new and unique manner which has not been part of the art previously. Some related patents are described below:

U.S. Pat. No. 2,904,889 issued to A. F. France II on Sep. 22, 1959

This patent describes a navigational instrument comprising a shadow device for measuring the altitude of a celestial body. The device includes a base and a base extension with a gnomon perpendicular to the base. The base has inscribed upon its upper surface graduated markings arranged to measure angles. In use, the gnomon casts a shadow on the base extension depending upon the elevation of the sun. The elevation of the sun can be read directly from the graduated markings on the base, or the base extension, respectively.

U.S. Pat. No. 5,186,630 issued to L. C. Tien on Feb. 16, 1993

This patent describes a universal sun-path dial comprising a base, a minor dial, a major dial and a sun-path slider. The sun-path dial includes a scale having graduations which indicate the approximate, maximum available solar energy, and watts per square foot, corresponding to the sun's angular height at a distance from a depicted horizon for a set graduation.

U.S. Pat. No. 5,028,792 issued to K. B. Mullis on Jul. 2, 1991

This patent describes a system for the visualization of exposure to ultraviolet radiation. The system comprises an ultraviolet radiation dosimeter which contains a calibrated color chart in close visual proximity to a UV sensitive film. A color change of the film is proportional to the cumulative amount of exposure to ultraviolet radiation which, when viewed against the calibrated chart, gives a measure of UV dosage. The dosimeter utilizes a chemical means which is color sensitive, relative to different amounts of UV radiation.

U.S. Pat. No. 1,496,403 issued to W. Atkinson on Jun. 3, 1924

This patent describes a sundial comprising a sheet of thin material such as paper, sheet metal, or other suitable substance, wherein the sheet has printed on its upper surface, concentric parallel circles extending in opposite directions from a zero point. A gnomon is produced by the formation of a triangular member directly from the sheet. In use, the gnomon, when in the vertical position, produces a shadow of the sun on the surface of the sheet for indicating the time of day.

While the basic concepts presented in the afore-described patents are desirable, the apparatus employed by each does not indicate the percentage of ultraviolet radiation present with respect to the sun's altitude.

SUMMARY OF THE INVENTION

The present invention utilizes the basic aesthetic principles of a sundial to provide a way to display and indicate the percentage of ultraviolet radiation reaching the surface of the earth relative to the Sun's altitude in the sky. The device consists of a planar member which in the preferred embodiment is a circularly shaped disk having a vertical pin affixed within its center. The vertical pin is known in the art as gnomon or sundial arm and marks the center of nine (9) concentric spaced rings inscribed on the disk. The innermost concentric ring is labeled 90%, the second 80% and so on in 10% increments to the disk's outer edge. The radius of each concentric ring is calculated by an equation which equates a percentage amount of UV-B radiation that reaches the surface of the earth for a given altitude of the sun.

It is an object of the present invention to provide a device for displaying a percentage of UV-B radiation which is simple in design and construction.

It is a further object of this invention to provide a device that at anytime of the day and for any season indicates the percentage amount of UV-B radiation reaching the ground relative to the sun at its zenith.

It is a further object of this invention to provide a device capable of giving the percentage amount of UV-B radiation for any location on the earth's surface without requiring complex mechanical or electrical features.

Another object of this invention is to provide a sundial which is adapted to give the percentage of UV-B radiation at any location on the earth without being unduly confusing.

Still another object of the invention is to provide a device for measuring the percentage of UV-B radiation which is inexpensive to manufacture, easy to use and does not require any external power sources.

Accordingly, it is an object of the present invention to provide a sundial adapted for measuring the relative amounts of UV-B radiation for the ever changing angle of the sun thereby providing a useful monitor for one's exposure to possibly harmful rays

BRIEF DESCRIPTION OF THE DRAWINGS

The above, as well as other, advantages of the present invention will become readily apparent to those skilled in the art from the following detailed description of the preferred embodiment when considered in light of the accompanying drawings in which.

DESCRIPTION OF THE PREFERRED EMBODIMENTS

Figure 1:
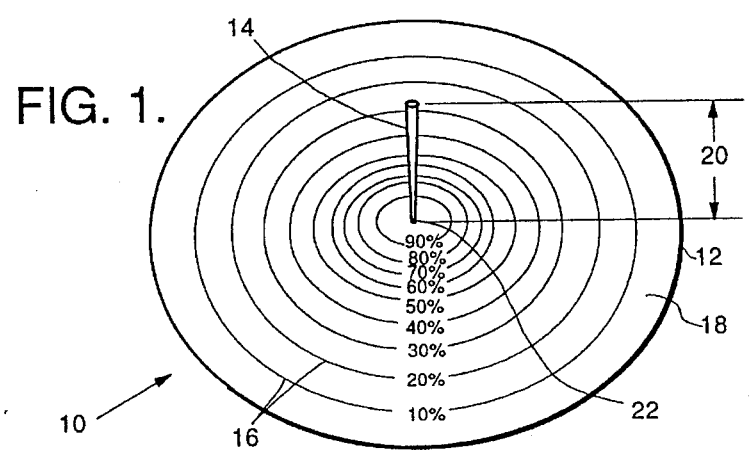
FIG. 1 is a perspective view of the ultraviolet sundial of the present invention.

Referring now to the drawings wherein like reference numerals refer to like and corresponding parts throughout, the ultraviolet sundial device of the present invention is generally indicated by numeral 10. Referring now to FIG. 1, the ultraviolet sundial device 10 of the present invention comprises a planar member 12 having a flat top surface 18 upon which there is inscribed a plurality of spaced concentric rings 16. A gnomon like member 14 is affixed and supported about a center 22 of the planar member 12 and the spaced concentric rings 16, respectively. As shown in FIG. 1, the gnomon like member 14 projects into a plane perpendicular to the planar member 12. The gnomon like member 14 has a height 20 relative to the concentric rings 16 for indicating the percentage of ultraviolet radiation, as will be more fully described below.

As shown in FIG. 1, in the preferred embodiment, planar member 12 is shaped as a cylindrical disk, however, it should be understood that the ultraviolet sundial device 10 of the present invention could be of any geometrical shape having inscribed thereon spaced concentric rings 16 on a flat surface 18. Also, in the preferred embodiment, the gnomon like member 14 comprises a cylindrical rod having a diameter chosen for aesthetic purposes only.

The ultraviolet sundial device 10 may be fabricated from various structural materials with the planar member 12 preferably made from flexible plastic material and the gnomon-like member made of a rubberized material, so that in use it cannot hurt a person or thing which falls upon it, and can be manufactured by inexpensive molding processes. While the ultraviolet sundial device 10 has been described in its preferred form as being flexible, it may be made rigid out of metal materials.

Referring once again to FIG. 1, in the preferred embodiment, the gnomon-like member 14 marks the center 22 of nine (9) spaced concentric rings 16 inscribed within the flat surface 18 of planar member 12. The innermost concentric ring 16 is labeled 90%, the second 80%, and so on in 10% increments to the outer edge of planar member 12. The radius of each concentric ring 16 is calculated such that at any time of day, and for any season, the ultraviolet sundial device 10 indicates the percentage amount of UV-B radiation reaching the ground relative to the sun at its zenith, as will be more fully described below.

The idea for gauging the strength of UV-B radiation reaching the ground by observing the sun's altitude was disclosed to the Applicant in the July 1993 issue of *Sky and Telescope* magazine, in an article entitled *Suntans in The Ozone Layer*, by Bradley E. Schafer. The Applicant makes no claim to this idea. The relationship between the amount of UV-B radiation reaching the ground and the sun's altitude is described for the sake of completeness, and also because a knowledge of the relationship facilitates an understanding of the design of the Applicant's invention.

The type of radiation known as UV-B is that part of the ultraviolet spectrum between 2800 and 3200 angstroms which diminishes quite rapidly as the sun's altitude decreases. One factor that accounts for this rapid decrease is that the solar rays of the sun go through a larger air mass. By definition, the rays go through one air mass when the sun is at zenith.

The mathematical relationship used to design the ultraviolet sundial device 10 of the present invention is derived from well-known facts regarding this rapid diminution of UV-B radiation when air masses increase as the sun's altitude decreases. Hence, the mathematical relationship between the sun's altitude at an angle ($\infty$) and the UV-B radiation intensity (I) relative to the UV-B radiation intensity ($I_z$) at zenith can be calculated by the foregoing formula:

$$1 - 1/\text{Sin}(\infty) = 0.78 * \text{LOG}_{10}(I/I_z)$$

Figure 2:
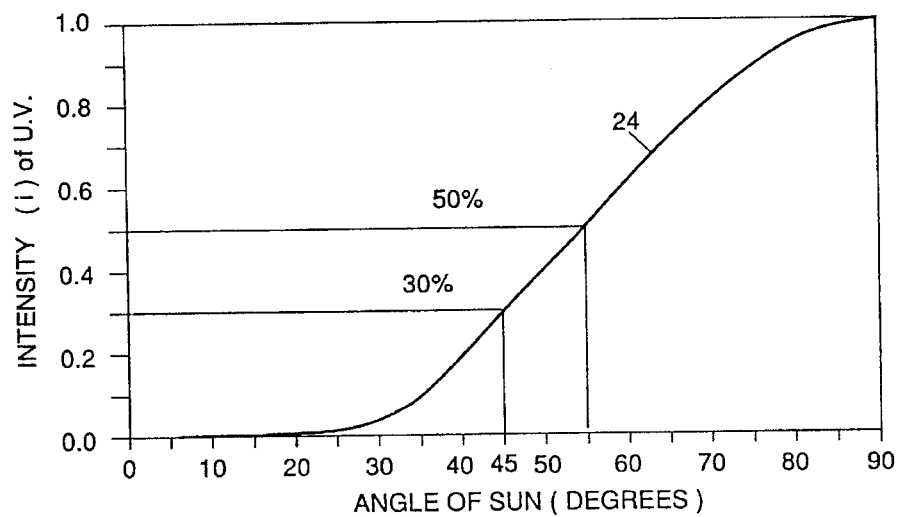
FIG. 2 is a graphical representation of the percentage of ultraviolet radiation as a function of the sun's altitude in accordance with the present invention.

Referring now to the graph shown in FIG. 2, the angle ($\infty$) in degrees corresponding to the sun's altitude is plotted with respect to the percentage of UV-B radiation intensity ($I/I_z$) or (i). As shown in FIG. 2, when the sun reaches zenith the intensity reaches 100% wherein curve 24 follows the mathematical relationship described above. By way of example but not of limitation, when the angle ($\infty$) of the sun is at 45 degrees, the percentage amount of UV-B radiation is at 0.3 or 30% and when the angle ($\infty$) of the sun is approximately 55 degrees, the percentage amount of UV-B radiation is approximately 50%.

Therefore, as the sun's altitude decreases, the UV-B radiation diminishes rapidly, going from 100% at a 90 degree angle of altitude to less than 10% for an altitude angle of 30 degrees for the sun. By expressing the above-described mathematical relationship trigonometrically, the radius for each concentric ring 16 inscribed on the top surface 18 of the planar member 12 can be calculated by the following formula:

$$C = 0.78 * \log_{10}(I/I_z)$$
$$R = H * \sqrt{[(1-C)^2 - 1]}$$

Wherein the variable R relates to the radii of the circumferences of the concentrically spaced rings 16 of the ultraviolet sundial device 10, and the variable H is the gnomon-like member's 14 height 20.

Therefore, the ultraviolet (UV-B) sundial device 10 of the present invention displays a percentage of ultraviolet (UV-B) radiation present during the course of the sun's daily path by the shadow cast by the gnomon like member 14 in the presence of ambient sunlight across the circumferences of the concentrically spaced rings 16.

By way of example but not of limitation, Table 1 shows the calculated values in inches for the radius of each concentric ring 16 which inscribes a circumference for a range of percent intensities for a gnomon-like member's 14 height 20 of 10 inches, in accordance with the above-described formula.

TABLE 1

| intensity i ($I/I_z$) | C | | radius of concentric ring R (inches) | angle of incidence α (degrees) |
|---|---|---|---|---|
| 10% | 0.10 | −0.780 | 14.7" | 34.2° |
| 20% | 0.20 | −0.545 | 11.8" | 40.3° |
| 30% | 0.30 | −0.408 | 9.9" | 45.3° |
| 40% | 0.40 | −0.310 | 8.5" | 49.8° |
| 50% | 0.50 | −0.235 | 7.2" | 54.1° |
| 60% | 0.60 | −0.173 | 6.1" | 58.5° |
| 70% | 0.70 | −0.121 | 5.1" | 63.1° |
| 80% | 0.80 | −0.076 | 4.0" | 68.3° |
| 90% | 0.90 | −0.036 | 2.7" | 74.9° |

Although the ultraviolet sundial device 10 of the present invention is designed in accordance with the above-described mathematical formula, it may be envisioned that any mathematical relationship which correlates the intensity of the UV-B radiation corresponding to the sun's altitude may be used. Additionally, since ozone absorbs UV-B radiation and many pollutants can destroy ozone in the stratosphere, a percent change of ozone would result in a corresponding change to the constant 0.78 of the above-described mathematical formula.

Figure 3:
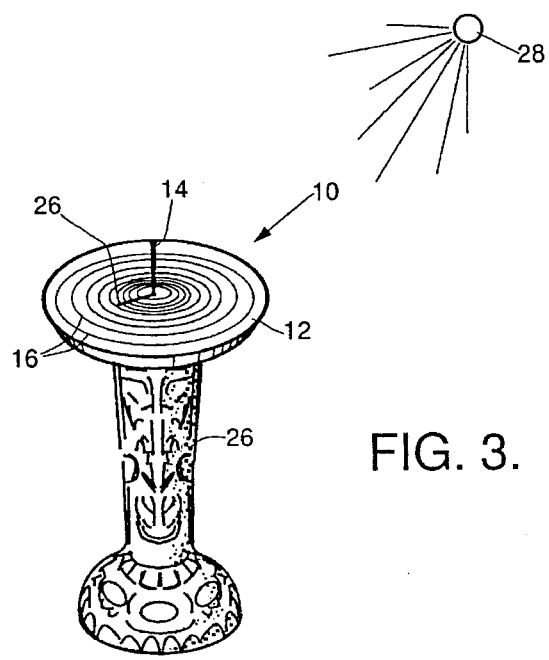
FIG. 3 is a perspective view showing one embodiment of the present invention in use.

Referring now to FIG. 3, there is shown one preferred embodiment of the ultraviolet sundial device 10 of the present invention wherein the nine (9) concentric circles circumferences 16 are inscribed into a flat circular plate 12 comprising the top portion of an ornamental pedestal 26. In the preferred embodiment, the circular disk 12 has a 10 inch diameter with the gnomon-like member 14 having a height 20 of 3 inches.

As shown in FIG. 3, in use, when the sun 28 is at an altitude corresponding to a time of 2:00 p.m. during a typical summer month, the gnomon like member 14 casts a shadow 26 between the 60% to 70% inscribed concentric rings 16, indicating to the user the possibility of harmful exposure to the sun's 28 rays.

There has been described and illustrated herein an improved device for measuring the percentage of ultraviolet radiation in association with the sun's altitude. While particular embodiments of the invention have been described, it is not intended that the invention be limited exactly thereto, as it is intended that the invention be as broad in scope as the art will permit. The foregoing description and drawings will suggest other embodiments and variations within the scope of the claims to those skilled in the art, all of which are intended to be included in the spirit of the invention as herein set forth.

What is claimed is:

1. A device for indicating ultraviolet radiation comprising:
   a planar member having a plurality of spaced concentric rings on a top surface thereof, said concentric rings each defining an inscribed circumference for indicating a percentage of ultraviolet radiation; and
   a gnomon-like member supported in about a center of said planar member and projecting into a plane perpendicular to said planar member whereby said gnomon like member has a height relative to said concentric rings adapted to the casting of a shadow across said concentric rings when said device is in ambient sunlight thereby indicating the percentage of ultraviolet radiation corresponding to the sun's altitude relative to said planar member.

2. A device according to claim 1, wherein said plurality of concentric rings comprises nine concentric rings defining inscribed circumferences labeled 90 percent to 10 percent in 10 percent increments wherein the innermost inscribed circumference is 90 percent and the outermost inscribed circumference is 10 percent.

3. A device according to claim 2, wherein radii R of said rings are determined by said height H of said gnomon-like member according to the equation $$C = 0.78 * \log_{10}(I/I_z)$$

$$R = H * \sqrt{((1-C)^2 - 1)}$$

where I is the UV-B radiation intensity at sun angle alpha and $I_z$ is the UV-B radiation intensity at sun zenith.

4. A device according to claim 1, wherein said planar member is a circular disk.

5. A device according to claim 1, wherein said gnomon like member is shaped as a cylindrical rod.

6. A device according to claim 1, wherein said planar member is made of a plastic material and said gnomon like member is made of a rubberized material.

7. A device according to claim 1, wherein said planar member and said gnomon like member are both made out of metal.

8. A device according to claim 1, wherein said planar member is a circular disk having a diameter of ten inches and said gnomon-like member is a vertical pin with a height of three inches.

9. A device according to claim 1, wherein said planar member comprises a top portion of a pedestal having a circular circumference of 31 inches and defining a cylindrical rod having a height of three inches on a top surface thereof, said rod comprising said gnomon like member, said concentric rings comprising nine (9) concentric rings defining inscribed circumferences labeled 90% to 10% in 10% increments wherein the innermost and inscribed surface is 90% and the outermost and inscribed surface is 10%.

10. A device for indicating ultraviolet radiation comprising:
    a planar member having a plurality of spaced concentric rings on a top surface thereof, said concentric rings each defining an inscribed circumference for indicating a percentage of ultraviolet radiation; and
    a gnomon-like member supported in about a center of said planar member and projecting into a plane perpendicular to said planar member whereby said gnomon-like member having an approximate height H relative to radii R of said concentric rings approximated by the equation:

$$C = 0.78 * \log_{10}(I/I_z)$$

$$R = H * \sqrt{((1-C)^2 - 1)}$$

where I is the UV-B radiation intensity at sun angle alpha and $I_z$ is the UV-B radiation intensity at sun zenith,
    wherein said gnomon-like member is adapted to the casting of a shadow across said concentric rings when said device is in ambient sunlight thereby indicating the percentage of ultraviolet radiation corresponding to the sun's altitude relative to said planar member.

11. A device according to said claim 10, wherein said planar member is a circular disk.

12. A device according to claim 10, wherein said gnomon-like member is a cylindrically shaped rod.

13. A device according to claim 10, wherein said planar member is made of a plastic material and said gnomon-like member is made from a rubberized material.

14. A device according to claim 10, wherein said planar member and said gnomon-like member are made out of metal.

15. A device according to claim 10, wherein said planar member is a cylindrical disk having a diameter of ten inches and said gnomon-like member is a cylindrically shaped rod with a height of three inches.

16. A device according to claim 10, wherein said planar member comprises a top portion of a pedestal having a circular circumference of 31 inches and defining a cylindrical rod having a height of three inches on a top surface thereof, said rod comprising said gnomon like member, said concentric rings comprising nine (9) concentric rings defining inscribed circumferences labeled 90% to 10% in 10% increments wherein the innermost and inscribed surface is 90% and the outermost and inscribed surface is 10%.

17. An apparatus for indicating ultraviolet radiation comprising a cylindrical disk having a plurality of spaced concentric rings on a top surface thereof, said plurality of concentric rings comprising nine (9) concentric rings defining inscribed circumferences labeled 90% to 10% in 10% increments, wherein the innermost inscribed circumference is 90% and the outermost inscribed circumference is 10%, said inscribed circumferences for indicating a percentage of ultraviolet radiation;

a cylindrical rod supported in and about a center of said cylindrical disk and projecting into a plane perpendicular to said cylindrical disk, wherein said cylindrical rod having an approximate height H relative to said concentric rings adapted to the casting of a shadow across said concentric rings having radii R approximated by the equation:

$$C = 0.78 * \log_{10}(I/I_2)$$

$$R = H * \sqrt{((1 - C)^2 - 1)} \quad \text{and}$$

where I is the UV-B radiation intensity to sun angle alpha and $I_z$ is the UV-B radiation intensity at sun zenith, whereby said device in the presence of ambient sunlight indicates the percentage of ultraviolet radiation corresponding to the sun's altitude relative to said cylindrical disk.

18. A device according to claim 17, wherein said cylindrical disk having a diameter of ten inches and said cylindrical rod has a height of three inches.

* * * * *